United States Patent [19]

Lewis et al.

[11] 3,974,647

[45] Aug. 17, 1976

[54] COMBUSTION INSTABILITY REDUCTION DEVICE HAVING SWIRLING FLOW

[75] Inventors: George D. Lewis, North Palm Beach; Gary D. Garrison, Jupiter, both of Fla.

[73] Assignee: United Technologies Corporation, Hartford, Conn.

[22] Filed: Aug. 26, 1974

[21] Appl. No.: 500,414

[52] U.S. Cl. ............................. 60/39.72 P; 60/261; 431/352
[51] Int. Cl.² ....................... F02C 3/00; F02K 3/10
[58] Field of Search............ 60/261, 39.65, 39.74 R, 60/39.5, 39.72 P; 431/351, 352

[56] References Cited
UNITED STATES PATENTS

| | | |
|---|---|---|
| 2,659,201 | 11/1953 | Krejci .............................. 60/39.65 |
| 3,099,134 | 7/1963 | Calder et al. ..................... 60/39.65 |
| 3,451,216 | 6/1969 | Harding ............................ 60/39.65 |
| 3,872,664 | 3/1975 | Lohmann et al................... 60/39.65 |

*Primary Examiner*—Carlton R. Croyle
*Assistant Examiner*—Robert E. Garrett
*Attorney, Agent, or Firm*—Jack N. McCarthy

[57] ABSTRACT

A device for increasing combustion stability in a combustion chamber wherein the combustion chamber has a plurality of openings or apertures in the wall thereof, with each aperture having a swirl device therein to swirl gases passing through the apertures in either direction. A solid cylindrical wall extends around said combustion chamber to form a backing volume therebetween.

7 Claims, 7 Drawing Figures

U.S. Patent  Aug. 17, 1976  3,974,647
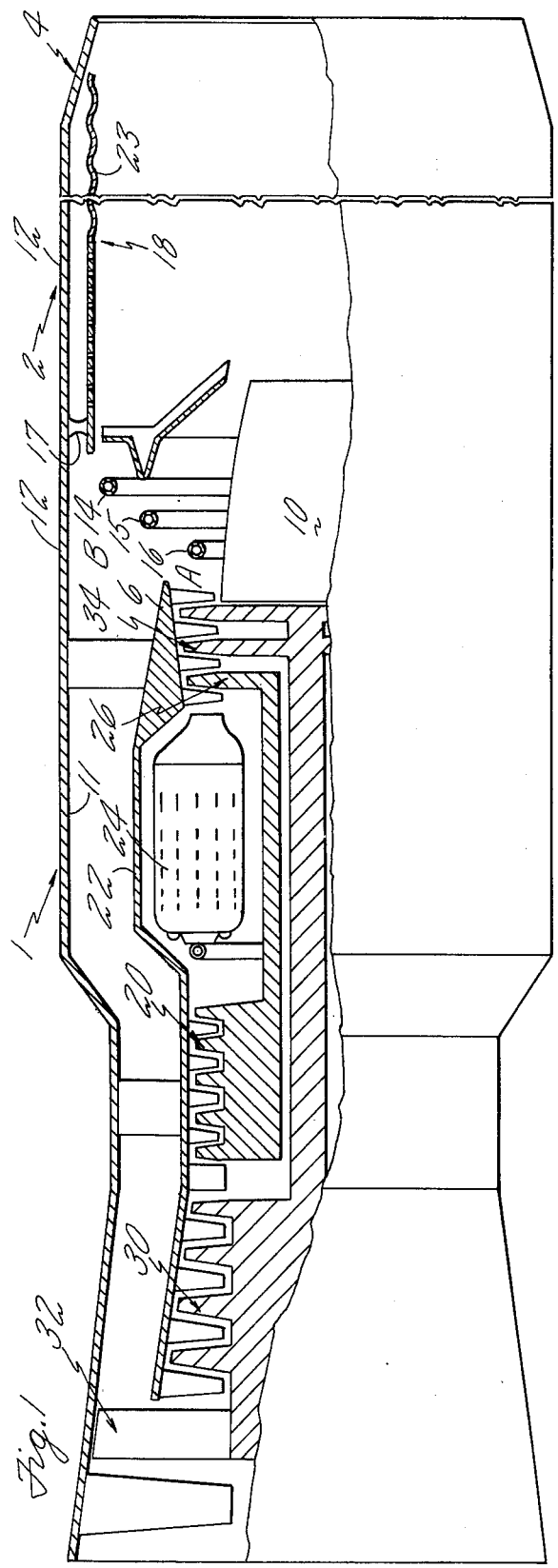
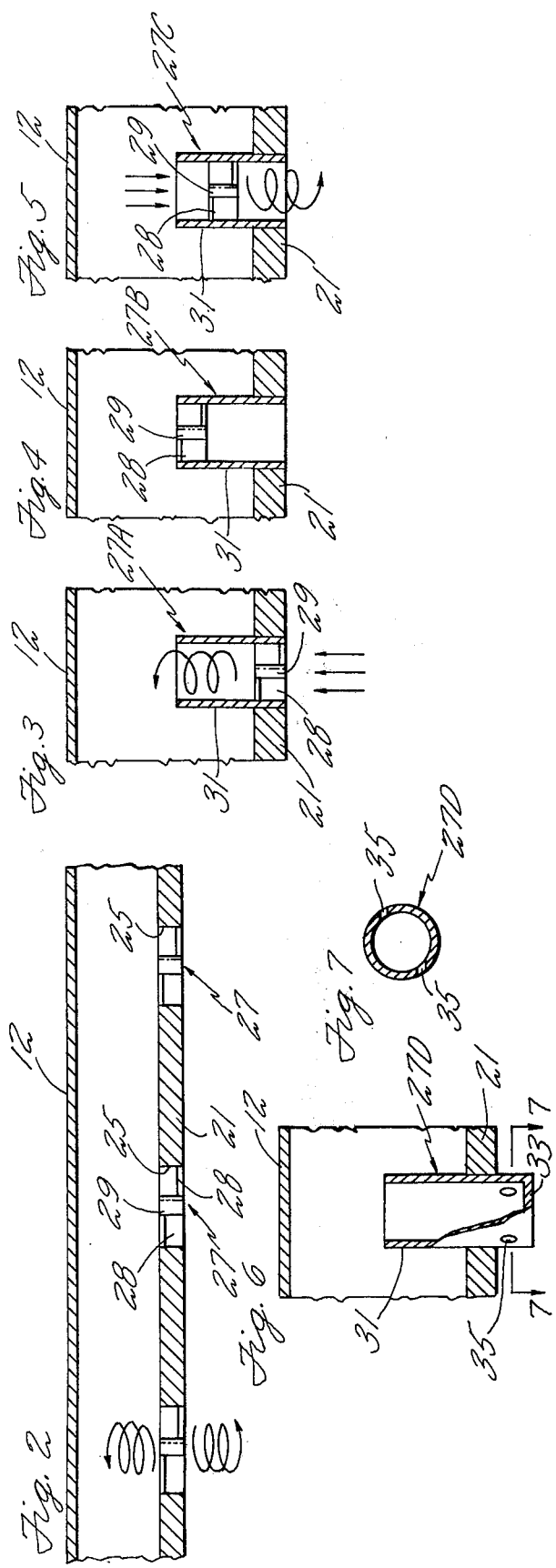

COMBUSTION INSTABILITY REDUCTION DEVICE HAVING SWIRLING FLOW

BACKGROUND OF THE INVENTION

This invention relates to a combustion instability device and particularly for the reduction of instability which may develop in the combustion chamber of a rocket engine or jet engine. Screech liners eliminate combustion instability by absorbing some of the pressure pulsations that strike them, instead of reflecting it, and dissipate absorbed energy in the form of turbulence, eventually heat. In normal screech liner design practice, a liner containing apertures is separated from a solid backing wall by a backing volume. This type of construction is shown in U.S. Pat. No. 2,930,195 and U.S. Pat. No. 2,941,356. Other combustion instability reduction devices are shown in U.S. Pat. No. 3,483,698, U.S. Pat. No. 3,426,409 and U.S. Pat. No. 3,359,737. These last three patents involve the specific construction of the apertures.

SUMMARY OF THE INVENTION

A primary object of the present invention is to provide an improved combustion instability reduction device wherein a screech liner formed with holes therethrough includes a swirl device so that gas flowing through the apertures swirls in one direction into the backing volume and swirls in the opposite direction into the combustion zone.

A further object of this invention is to provide swirl in the apertures of a combustion instability reduction liner so that more energy can be absorbed at lower frequencies by increasing the amount of energy that is absorbed as gas flows through the apertures. This is accomplished by placing swirl vanes in each of the openings, or apertures, of the combustion instability damping device, or screech liner.

BRIEF DESCRIPTION OF THE DRAWING

FIG. 1 is a view of a fan engine broken away to show flow through the engine into the afterburner.

FIG. 2 is an enlarged view taken through the screech liner showing the apertures therein having a swirl device therein.

FIG. 3 is an enlarged view of a modification of a swirl device in the apertures.

FIG. 4 is an enlarged view of another modification of a swirl device in the apertures.

FIG. 5 is an enlarged view of another modification of a swirl device in the apertures.

FIG. 6 is an enlarged view of another modification of a swirl device in the apertures.

FIG. 7 is a view taken along the line 7—7 of FIG. 6.

DESCRIPTION OF THE PREFERRED EMBODIMENT

A power plant as shown in FIG. 1 comprises a conventional fan engine 1 with an afterburner 2 and nozzle 4. Turbine engine exhaust flows from the core engine at A between the rear end of the splitter 6 and tail cone 10. Fan air flows from the outer fan duct 11 at B between the splitter 6 and the outer casing 12. Both of these flows, then enter the spraybar area, comprising three manifolds 14, 15 and 16 for injecting fuel into the afterburner, with a flameholder 19 being located downstream thereof. A liner 18 extends around the inner surface of the outer casing 12 and is fixed thereto by a plurality of spacing members 17. Some of the flow from the outer fan duct 11 passes between the liner 18 and outer casing 12.

The core engine comprises a first compressor 20, combustion section 22 with burners 24 and a turbine 26 drivingly connected to the compressor 20. A second compressor 30 having a fan 32 located at the forward end thereof is positioned forwardly of the compressor 20, and a turbine 34, positioned rearwardly of turbine 26, is drivingly connected to the compressor 30 and fan 32. While the burner, or combustion chamber, 24 is shown as cylindrical, the arrangement applies equally to a burner of annular or rectangular cross section.

The liner 18 comprises a screech liner section 21 and a cooling liner section 23. The screech liner section 21 includes a plurality of openings 25 each having a swirl device 27 located therein. The cooling liner section 23 is formed having corrugations and extends from the rear end of the screech liner section 21 to a point adjacent the nozzle 4. FIG. 2 which is an enlarged view of the screech liner section 23 shows the swirl device 27 to be a plurality of vanes 28 located around a center stem 29. It can be seen that when the pressure in the combustion zone of the afterburner is high, gas swirls through the apertures 25, as a result of the swirl device 27, into the backing volume, located between the screech liner section 21 and outer casing 12. When the pressure in the afterburner is low, the gas flows from the backing volume into the afterburner through the apertures 25, swirling about the center stems of the swirl devices 27 in the apertures 25.

FIG. 3 shows a modification of a swirl device 27A, wherein the device has an elongated tube section 31 which extends into the backing volume, with the vanes 28 and center stem 29 being located in line with screech liner section 21.

FIG. 4 shows a modification of the swirl device 27B, wherein the device has an elongated tube section 31 which extends into the backing volume, with the vanes 28 and center stem 39 being located at the outer end of the tube section 31.

FIG. 5 shows a modification of a swirl device 27C, wherein the device has an elongated tube section 31 which extends into the backing volume, with the vanes 28 and the center stem 29 being located between the ends of the tube section 31.

FIG. 6 shows a modification of a swirl device 27D, wherein the device has an elongated tube section 31 which extends into the backing volume and extends into the combustion zone of the afterburner, with the inner end being closed at 33. Tangential entry holes 35 are located around the periphery of the portion of the elongated tube section 31 which extends into the combustion zone; these tangential entry holes are used to swirl the flow in the tubes, such as the vanes 28 of the other modifications.

We claim:

1. In combination, an engine having a combustion chamber arranged to have reduced combustion instability, means for introducing combustion air into the combustion chamber, said combustion chamber having an enclosing wall with a plurality of rows of axially spaced openings therein forming a screech liner, said plurality of rows of axially spaced openings extending for a substantial length of the chamber, said openings having an oscillatory flow through them when combustion instability occurs, said wall having a backing chamber formed therearound including a solid wall which extends for the length of the plurality of openings, each opening of said wall being aligned substantially radially to the chamber and having means therein for swirling gas flow passing therethrough in both directions about the center of said opening between said combustion chamber and said backing chamber to increase the amount of energy absorbed as gas flows in both directions through the openings.

2. A combination as set forth in claim 1 wherein said combustion chamber is cylindrical.

3. A combination as set forth in claim 1 wherein said combustion chamber is an annulus enclosed between two concentric cylindrical members with the plurality of rows of openings being located in the outer member.

4. A combination as set forth in claim 1 wherein said combustion chamber is an annulus enclosed between two concentric cylindrical members with the plurality of rows of openings being located in the inner member.

5. A combination as set forth in claim 1 wherein said combustion chamber is an annulus enclosed between two concentric cylindrical members with the plurality of rows of openings being located in both members.

6. A combination as set forth in claim 1 wherein said means therein for swirling gas flow including a tubular member in each opening, said tubular member having swirl vanes therein.

7. A combination as set forth in claim 6 wherein said tubular member extends into the backing chamber towards said solid wall.

* * * * *